US009636980B2

(12) United States Patent
Van Boxtel et al.

(10) Patent No.: US 9,636,980 B2
(45) Date of Patent: May 2, 2017

(54) ROOF SYSTEM FOR A VEHICLE

(71) Applicant: Inalfa Roof Systems Group B.V., Venray (NL)

(72) Inventors: Eduardus Christianus Henricus Van Boxtel, Zeeland (NL); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 14/970,191

(22) Filed: Dec. 15, 2015

(65) Prior Publication Data

US 2016/0176273 A1 Jun. 23, 2016

(30) Foreign Application Priority Data

Dec. 17, 2014 (EP) .................................... 14198667

(51) Int. Cl.
- *B60J 7/047* (2006.01)
- *B60J 7/043* (2006.01)
- *B60J 7/02* (2006.01)

(52) U.S. Cl.
CPC ............. *B60J 7/0435* (2013.01); *B60J 7/024* (2013.01)

(58) Field of Classification Search
CPC ........... B60J 7/024; B60J 7/043; B60J 7/0435

USPC ........................................ 296/216.02–216.05
See application file for complete search history.

(56) References Cited

U.S. PATENT DOCUMENTS

| 7,828,376 | B2 * | 11/2010 | Nellen | ................... | B60J 7/0435 |
| | | | | | 296/216.03 |
| 2013/0187412 | A1 * | 7/2013 | Nellen | ..................... | B60J 7/024 |
| | | | | | 296/216.05 |

FOREIGN PATENT DOCUMENTS

EP 2554415 2/2013

* cited by examiner

*Primary Examiner* — Dennis H Pedder
(74) *Attorney, Agent, or Firm* — Steven M. Koehler; Westman, Champlin & Koehler, P.A.

(57) ABSTRACT

A roof system for a vehicle having a roof opening with a movable closure. A stationary guide rails guide operating mechanisms that operates the closure. The operating mechanism comprises a first device configured to move a rear edge upwardly and rearwardly and a second device including a lever to move a front edge of the closure. A guiding slide in the guide rail is coupled to the first device and the second device so as to move the closure. The lever has a pivotal connection to the closure and, remote from the pivotal connection, a sliding connection to the guiding slide by a first guide member and a sliding connection to a first stationary guide curve by a second guide member during movement of the closure. A third guide member on the lever of the second device engages a second stationary guide curve during movement of the closure.

15 Claims, 15 Drawing Sheets

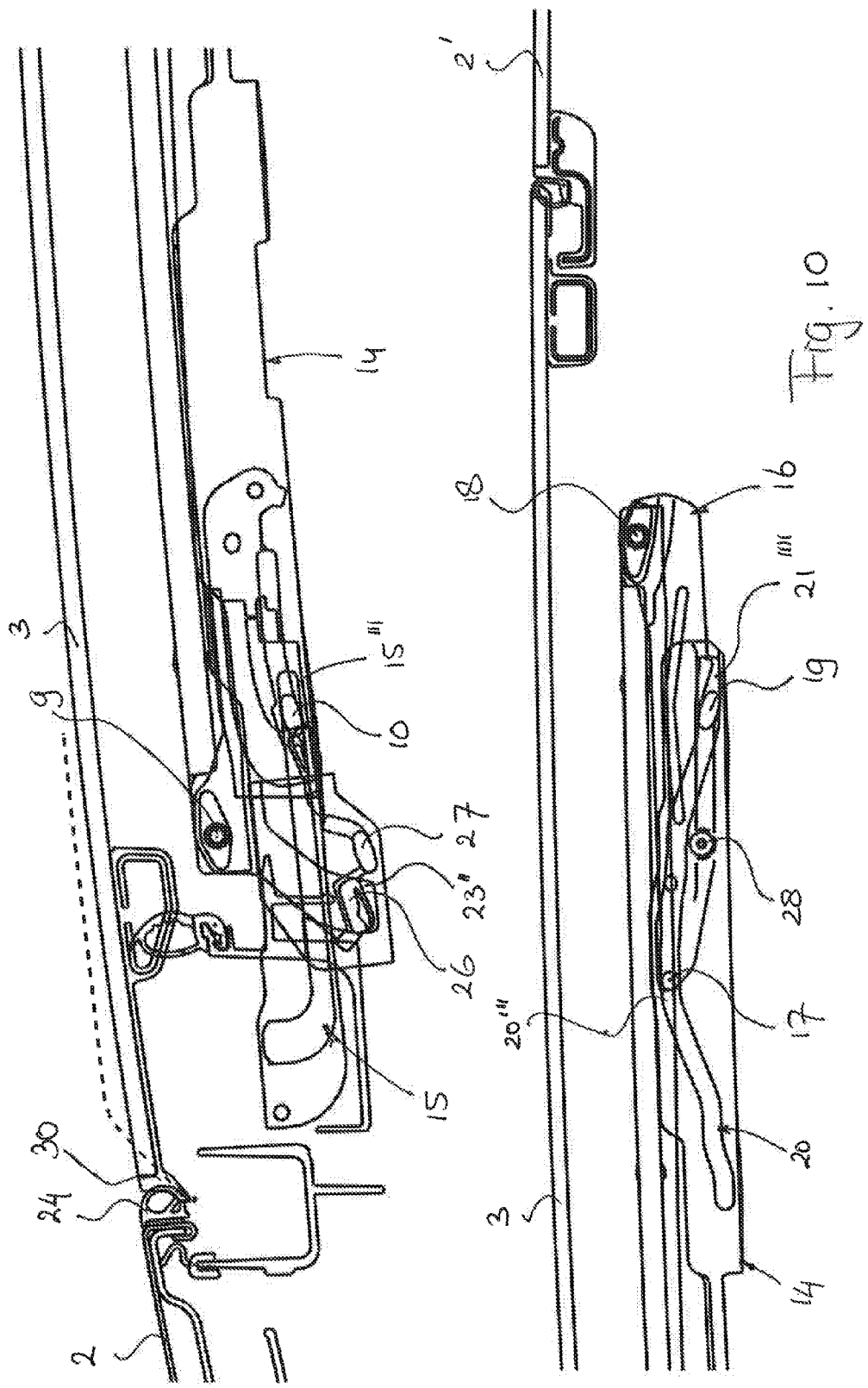

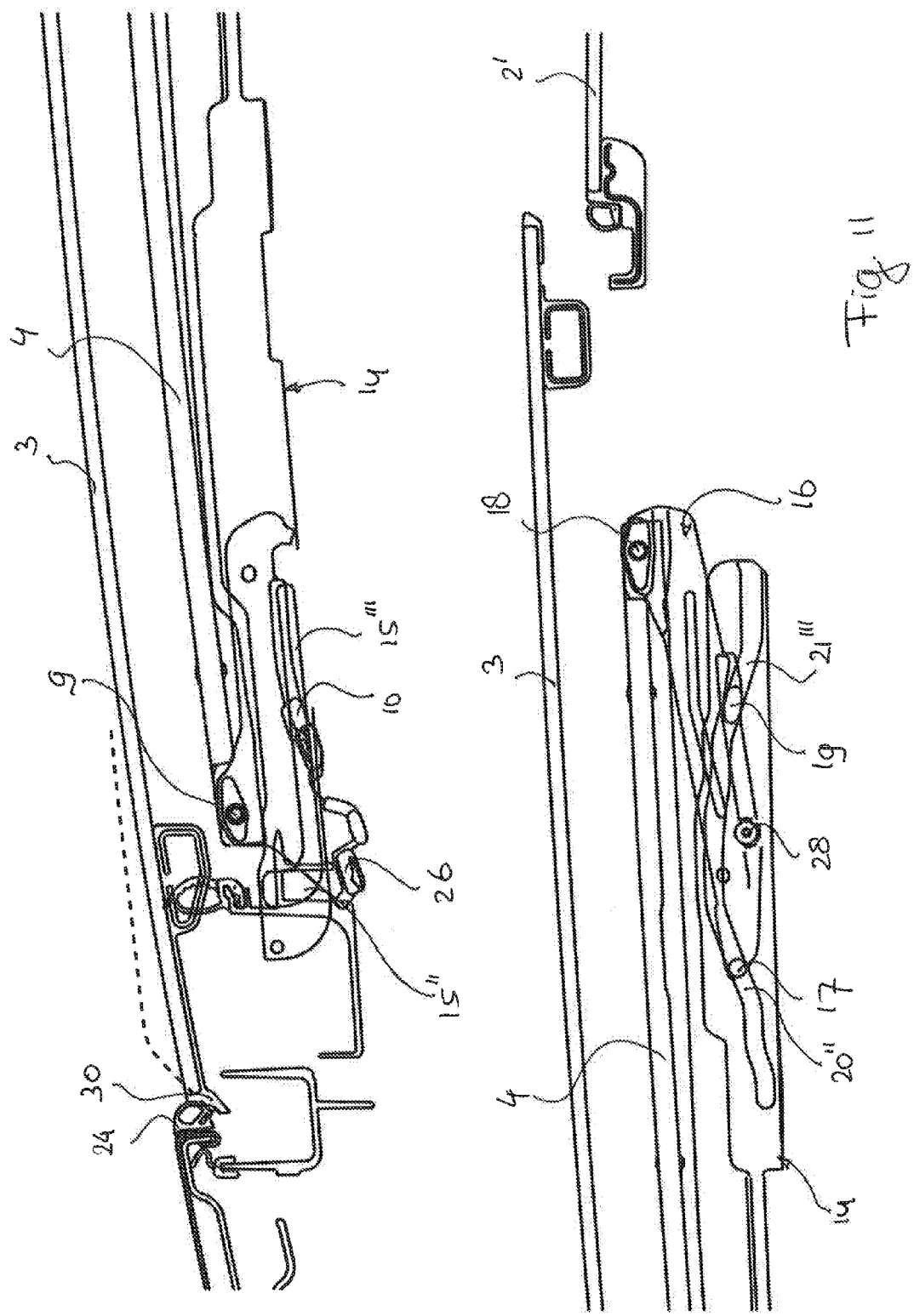

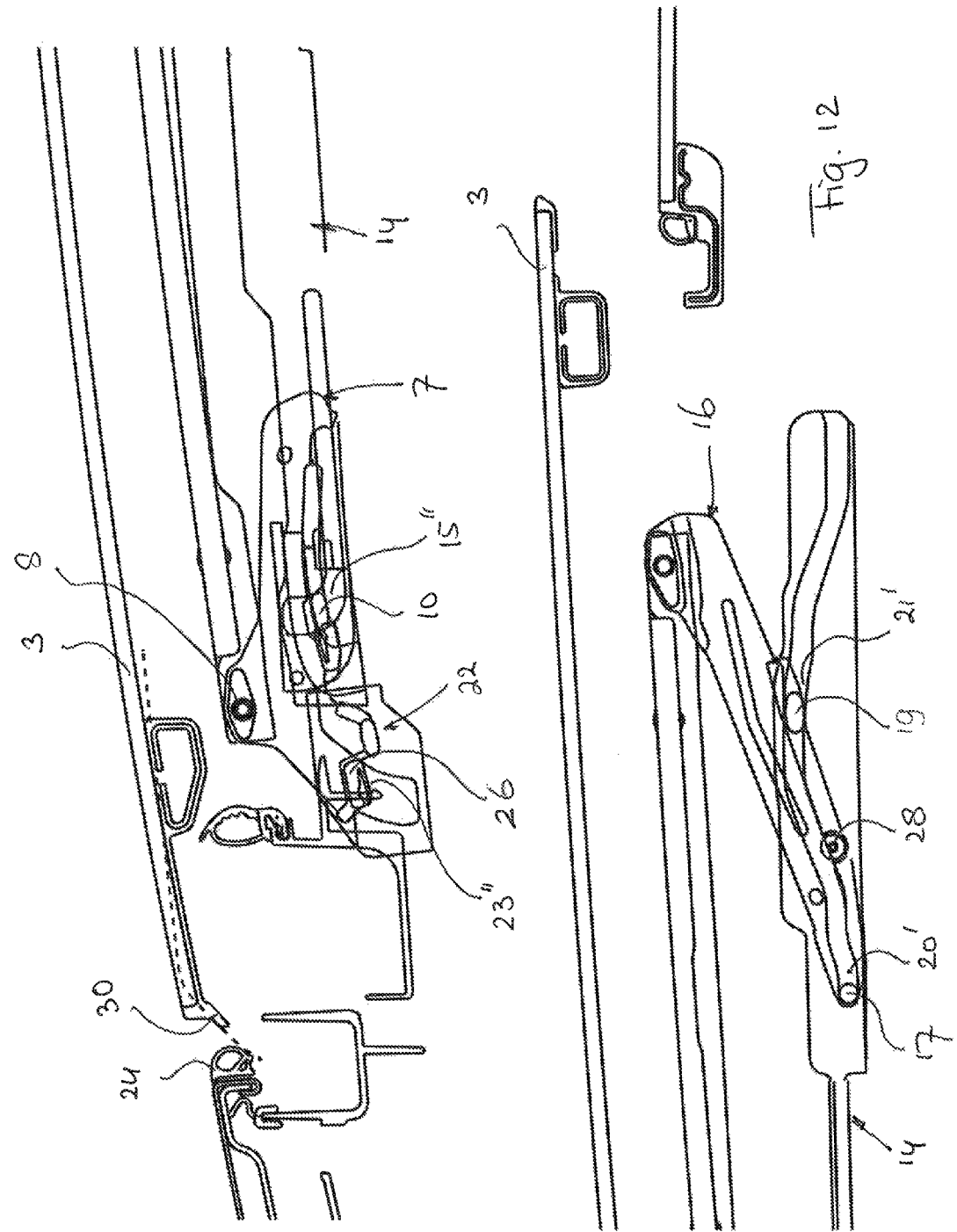

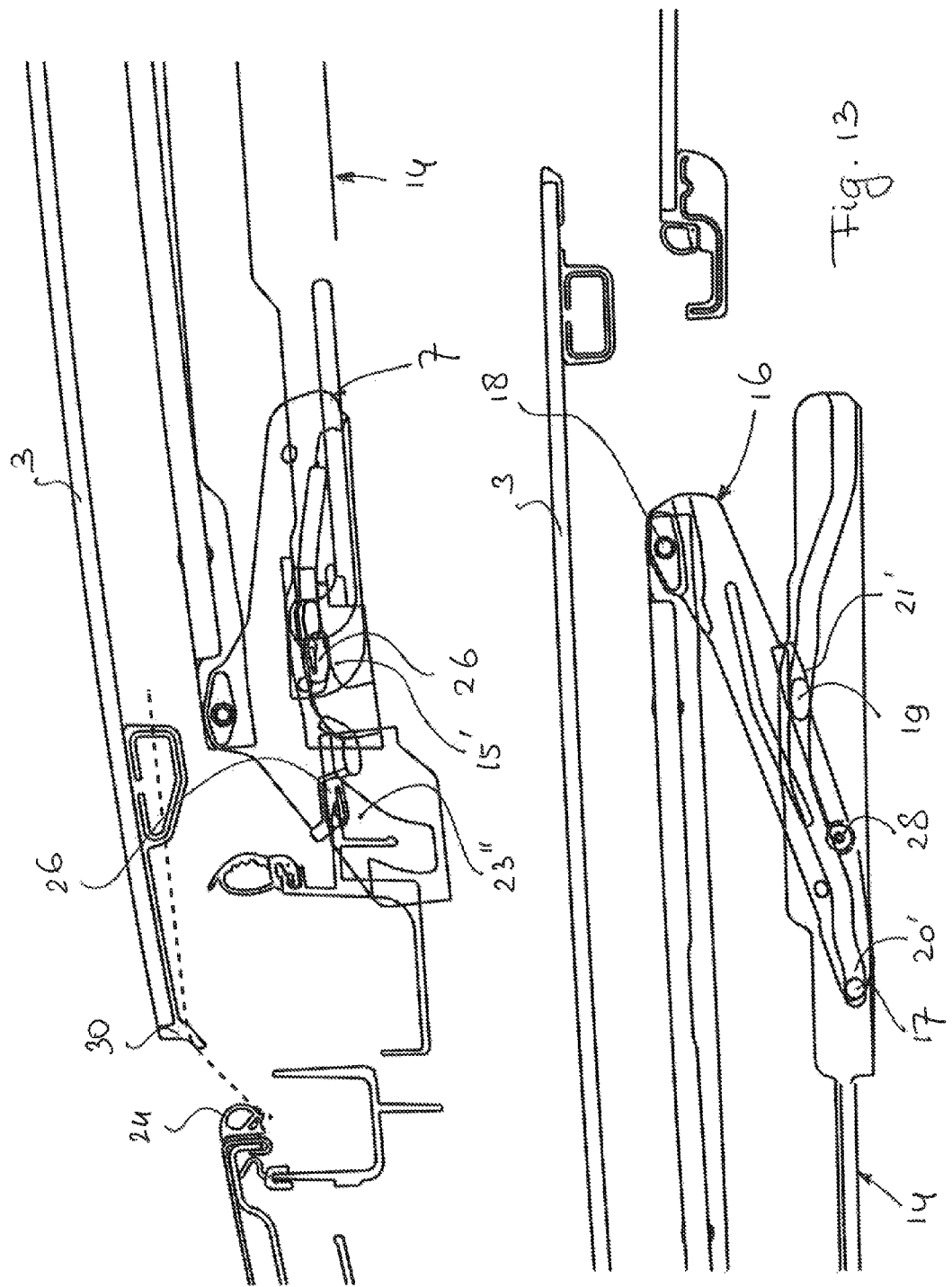

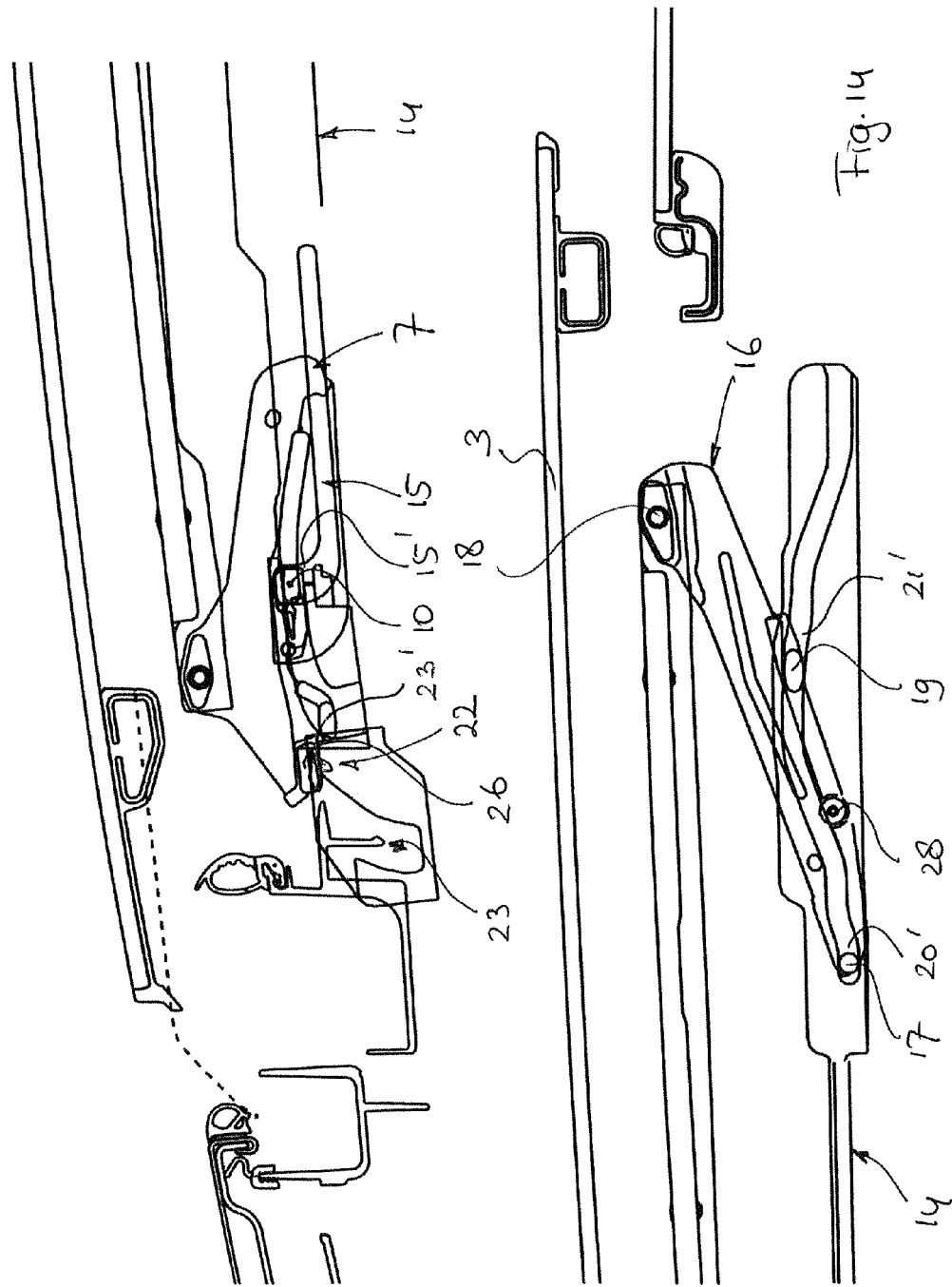

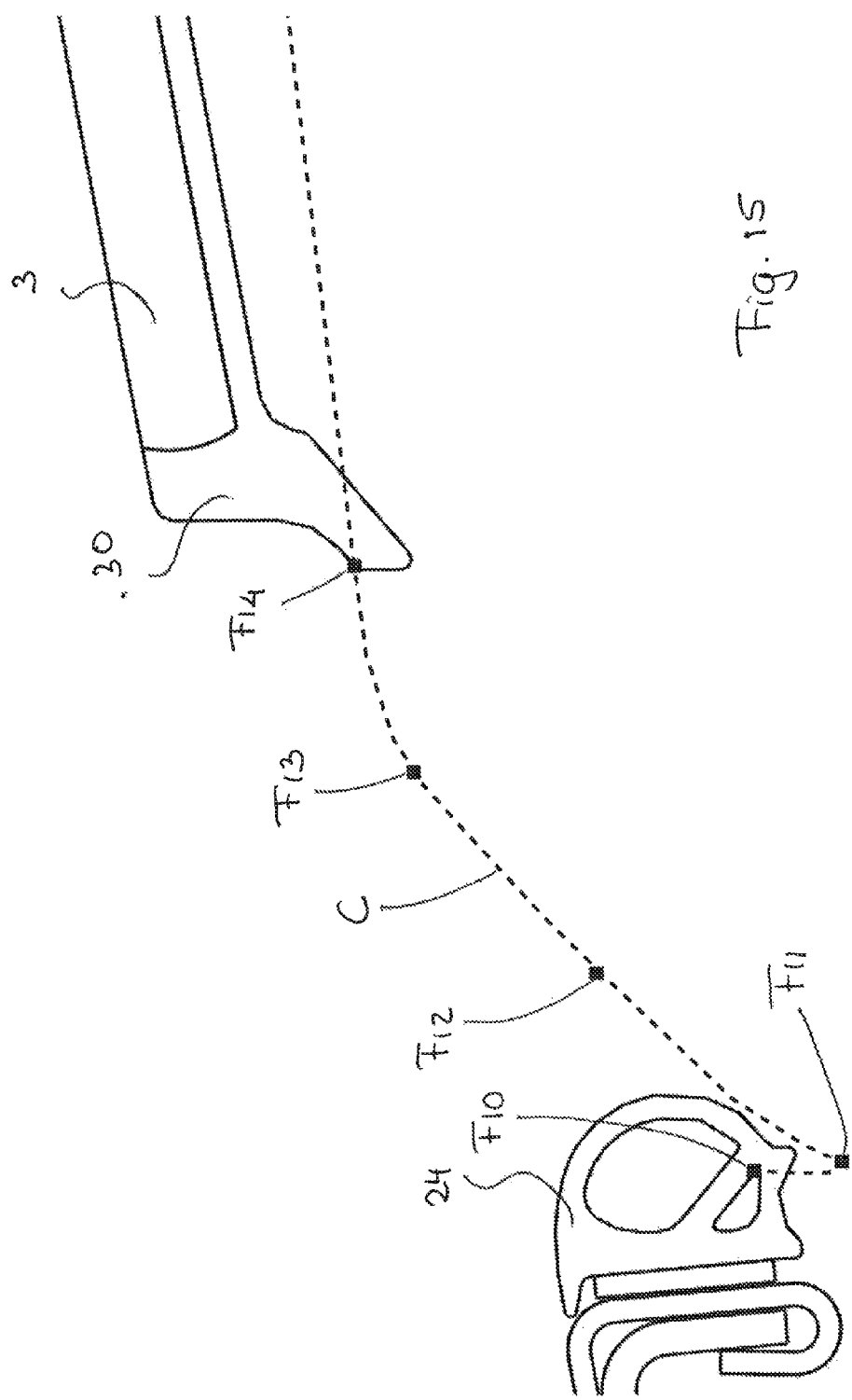

ROOF SYSTEM FOR A VEHICLE

BACKGROUND

The discussion below is merely provided for general background information and is not intended to be used as an aid in determining the scope of the claimed subject matter.

Aspects of the present invention relate to a roof system that opens and closes a roof opening in a vehicle. Generally, such roof systems include a closure element (hereinafter "closure") that is movable between a closed and open position in which it opens and closes the roof opening. Movement of the closure is effectuated by an operating mechanism. An improved operating mechanism in particular in relation to its stability under loads from the closure is often desired.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is to provide a roof system which is further improved in relation to the support and/or movements of the closure.

According to one aspect of the invention, there is provided at least a third guide member on the lever of the second device arranged at a position forwardly of the pivotal connection to the closure and engaging a second stationary guide curve at least during a part of the movement of the closure.

Due to the additional third guide member there is obtained an increased stability of the lever of the second device. The forward position of the third guide member makes it possible to position the second stationary guide curve for the third guide member on any side of the lever without interfering with the guiding slide. For example, the second and third guide members can be positioned on opposite sides of the lever to further improve stability thereof, especially if both guide members are supported in rearward positions of the closure.

In one embodiment, the guiding slide includes a curve through which the first guide member moves when the panel moves between the closed position and a venting position in which the rear edge of the closure is lifted, the curve extent is such that if the rear edge of the closure is lifted from the closed position a movement of the pivotal connection in vertical direction and a tilting movement of the closure together result in a downward movement of the front edge of the closure. Preferably, the extent of the curve in the guiding slide is such that if the rear edge of the of the closure is lifted from the closed position, the pivotal connection moves in upward direction, but the front edge of the closure moves nonetheless in downward direction.

This combined movement enables the front edge of the closure to move downward if the closure is moved to the venting position. This might lead to various advantages. First of all, it enables the front edge of the closure to release from its seal at the circumference of the roof opening to such an extent that the front will remain free from this front seal if the closure is subsequently moved rearwardly while raising the front edge of the closure in order to slide above the roof opening to a rearward position. So the wear of the seal is reduced. Another advantage could be that it enables the use of a center hook for the closure. This is an arrangement in the center of the front edge of the panel in the form of a hook or the like engaging below a counterpart at the fixed roof in order to prevent a lifting movement of the front edge of the closure when the vehicle drives at very high speeds. The downward movement of the front edge of the closure also means a downward movement of the hook thereby releasing from its counterpart at the fixed roof such that it stays clear from it when the front edge of the closure is subsequently moved rearwardly and upwardly.

The curve of the guiding slide may comprise a first curve portion which is relatively straight and slightly inclined to cause a movement of the pivotal connection and a second curve portion having a large vertical component to allow the front edge of the closure to be raised and to lock the lever with respect to the guiding slide to move the closure rearwardly toward its open position.

At least the second stationary guide curve may comprise a front portion at least partly inclined backwardly and upwardly to raise the front edge of the closure while it is moved rearwardly.

The second guide member may be supported in the first stationary guide curve when the closure is moved rearwardly towards its open position after the front edge of the closure has been raised at least partly, while the third guide member is supported by the second stationary guide curve at least when the front edge of the closure is raised. Preferably, however, the third guide member is supported by the second stationary guide curve in all positions of the closure to obtain maximum stability in all positions of the closure.

The third guide member may include two slide shoes positioned at a distance from each other, and the second stationary guide curve comprises a flange along at least a part of its length such that the two slide shoes are guided by the flange with the flange extending between the slide shoes.

This structure leads to a small package height while the third guide member is still supported in upward and downward direction.

However, it is also possible that the third guide member includes one sliding shoe, and the second stationary guide curve comprises a groove formed by two flanges along at least a part of its length such that the slide shoe is guided by the flanges of the groove.

The lever of the second device may be pivotally connected to a slide slidably guided by the guide rail to further increase stability of the lever of the front device.

In a particular embodiment, the first or rear device also comprises a lever being pivotally connected to the closure near the rear edge thereof, having at least a first guide member slidably engaging the guiding slide on one of its sides and at least a second guide member on its opposite side engaging a stationary guide curve.

This two-sided support of the lever of the first device also increases stability of the first device.

BRIEF DESCRIPTION OF THE DRAWINGS

Hereinafter aspects of the invention will be elucidated while referring to the drawings, in which:

FIGS. 10-14 are longitudinal sectional views of the operating mechanism of FIGS. 3 and 4 in different positions.

FIG. 15 is an enlarged longitudinal sectional view through the seal at the front edge of the roof opening and the front edge of the closure to illustrate the movement of the front edge of the closure.

DETAILED DESCRIPTION OF THE ILLUSTRATIVE EMBODIMENTS

Figure 1:
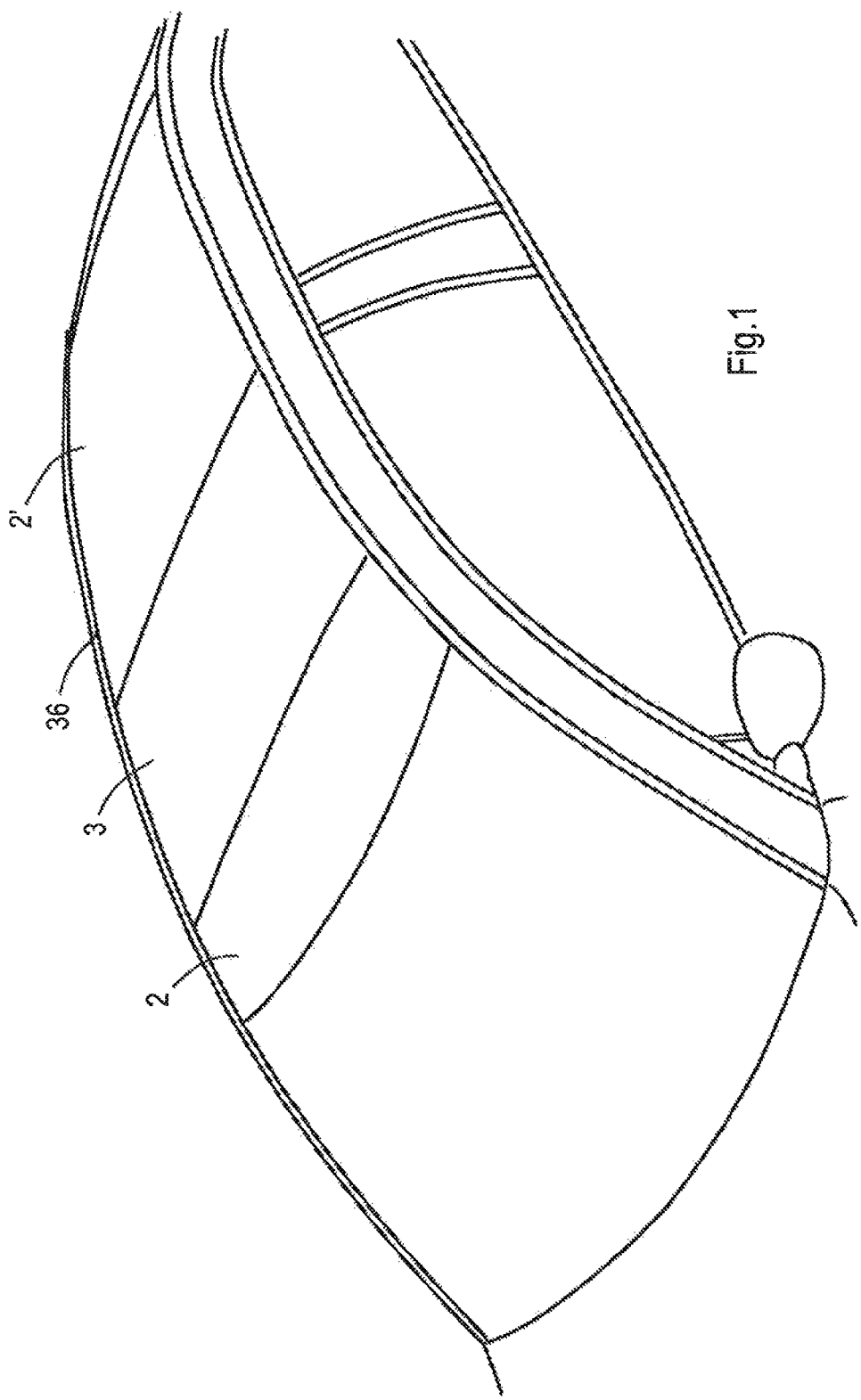
FIG. 1 is a schematic perspective view of a part of a vehicle with an embodiment of the roof system in a closed position.
Figure 2:
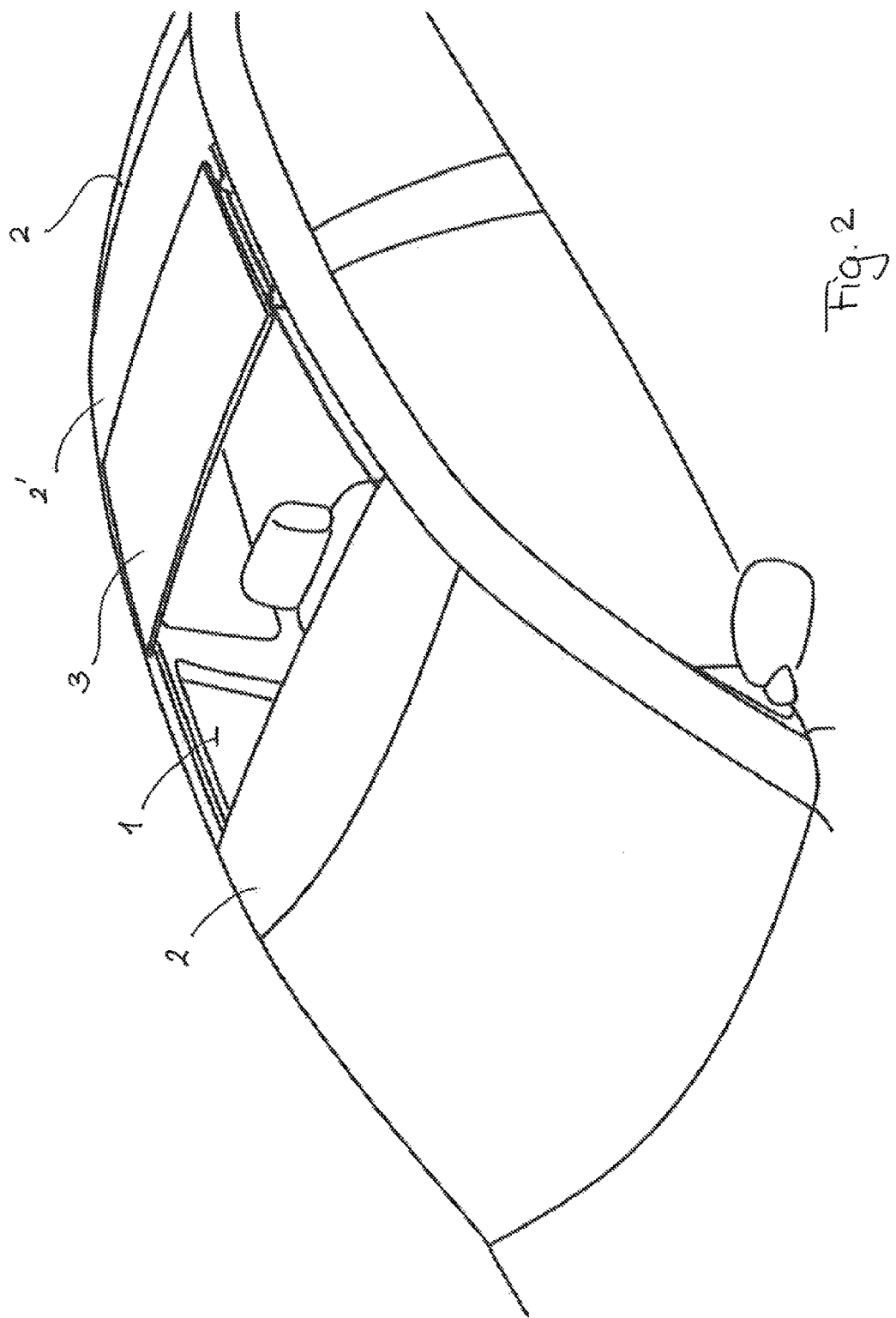
FIG. 2 is a view corresponding to that of FIG. 1 but showing a panel of the roof system in an open position.

FIGS. 1 and 2 show part of a vehicle, in particular an automobile, which comprises a roof opening 1 (FIG. 2) defined in a (stationary) roof part 2. A closure, here in the form of a panel 3, is movable between a closed position (FIG. 1) in which it closes the roof opening 1, and an open position (FIG. 2) in which it opens the roof opening 1 and in which it is positioned at least partially above the roof part 2, here the fixed roof part adjoining the rear of the roof opening 1.

As is known per se, such an roof system (which is also known as a top slider roof) could comprise additional elements, such as for example a tiltable wind deflector positioned ahead of the roof opening 1, or further movable or stationary panels, for example in a position behind the panel 3 when it is in its closed position. In fact, in the present embodiment, the roof part behind the roof panel 3 is formed by a roof panel 2' which may be a stationary roof panel or a movable panel.

The movement of the panel 3 from the closed position as illustrated in FIG. 1 towards an open position as illustrated in FIG. 2 is governed by an operating mechanism, the parts of which have been illustrated in FIGS. 3-9 and the operation of which is illustrated schematically in FIGS. 10-14. It is noted that FIGS. 3-14 represent an embodiment of an operating mechanism on one longitudinal side of the roof construction, i.e. one longitudinal side of the panel 3, and it should be understood that a corresponding operating mechanism normally will be provided at the opposite longitudinal side, generally in mirror image.

FIGS. 3-9 show the parts of an embodiment of one of the operating mechanisms. The mechanism is connected to the panel 3 through a closure support, in this case a panel bracket 4 which is fixed to the lower side of the panel 3 near the longitudinal edge thereof in any known manner, for example through encapsulation with a plastic material or through attachment to another encapsulated part. The operating mechanism includes a first or rear device 6 and a second or front device 5.

Figure 4:
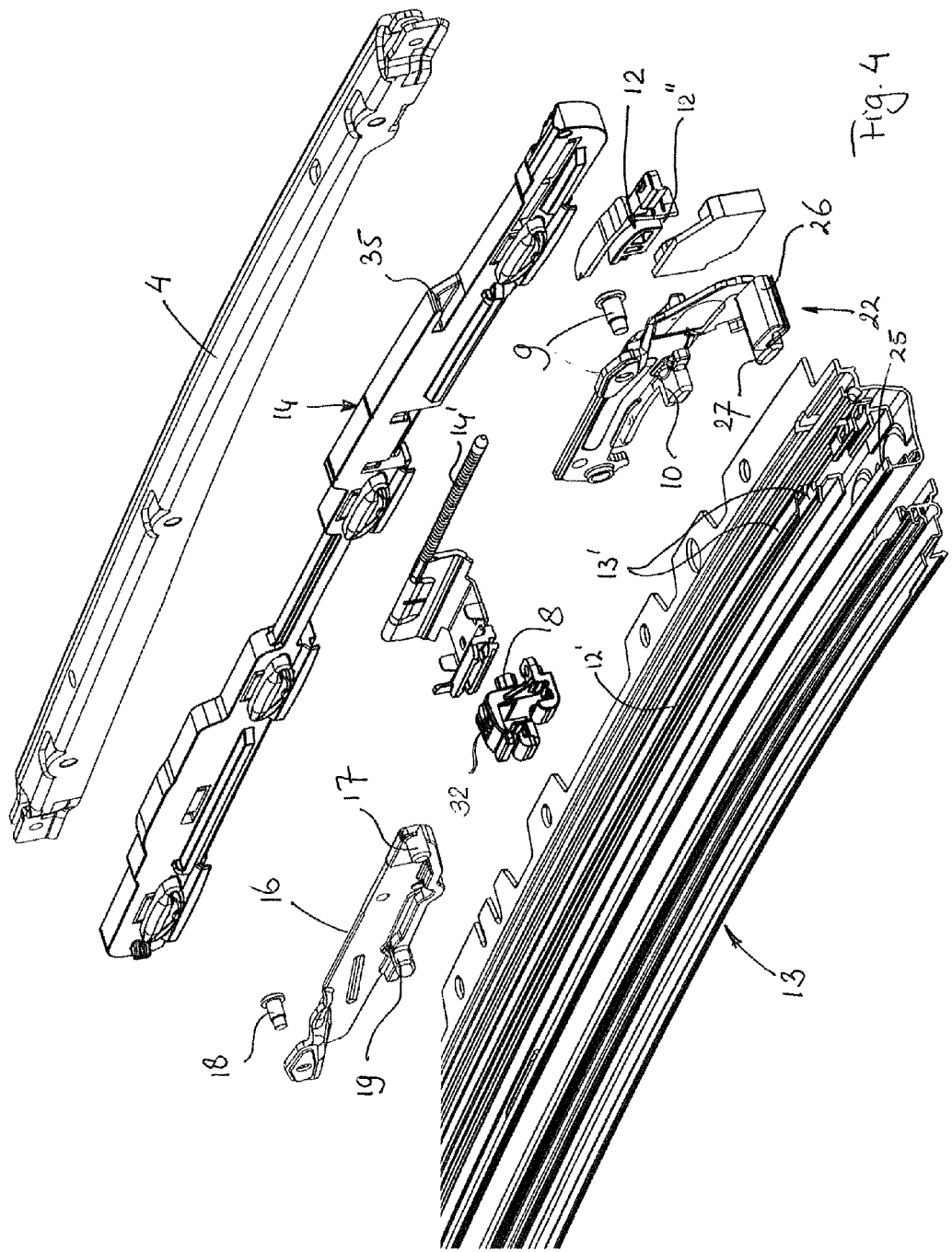
Figure 5:
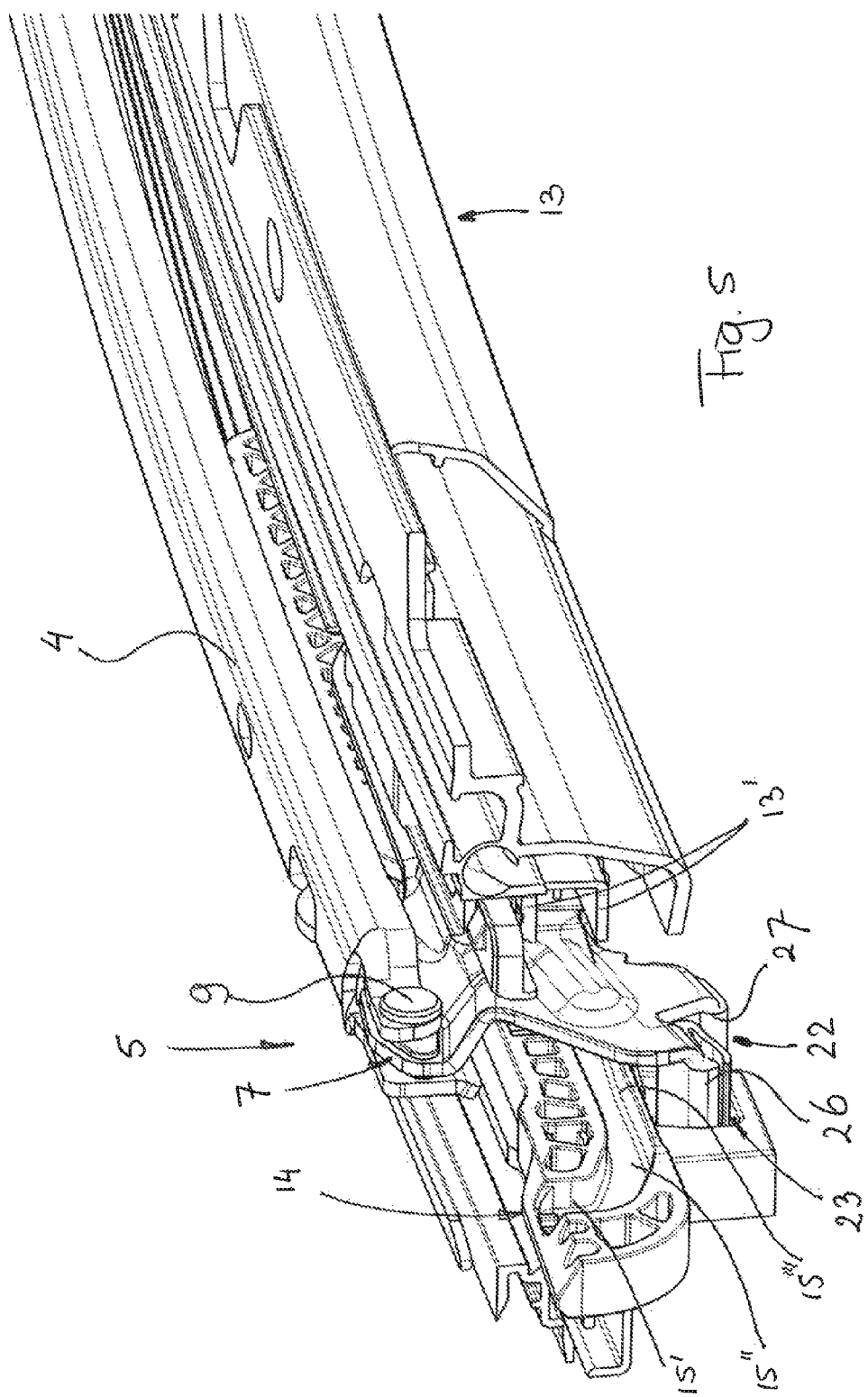
FIG. 5 is a partially cut-away perspective view of the guide rail with the operating mechanism of FIGS. 3 and 4.
Figure 6:
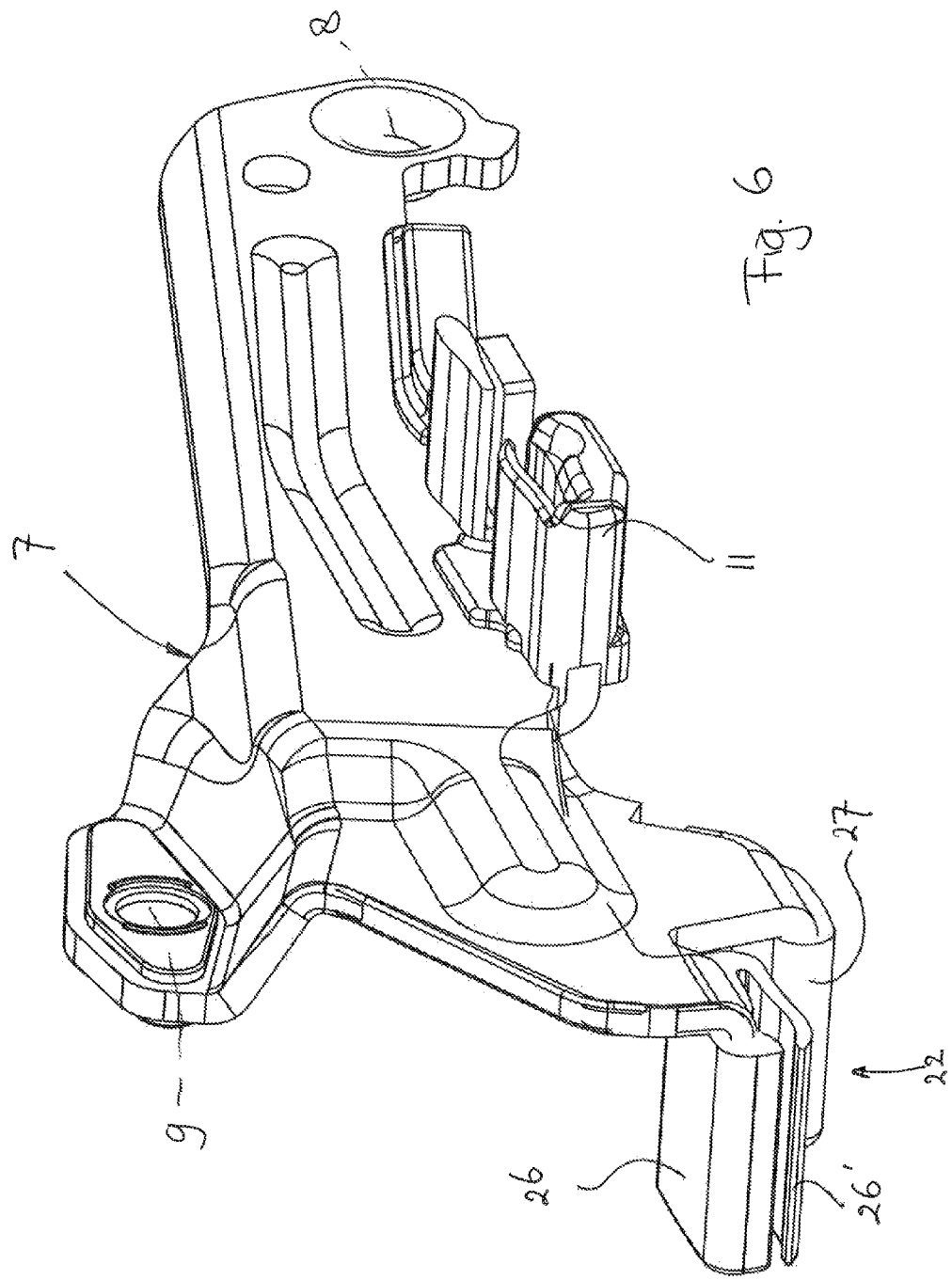
FIGS. 6 and 7 are enlarged perspective views of the lever of the front device of FIGS. 3 and 4 as seen from two different sides.
Figure 7:
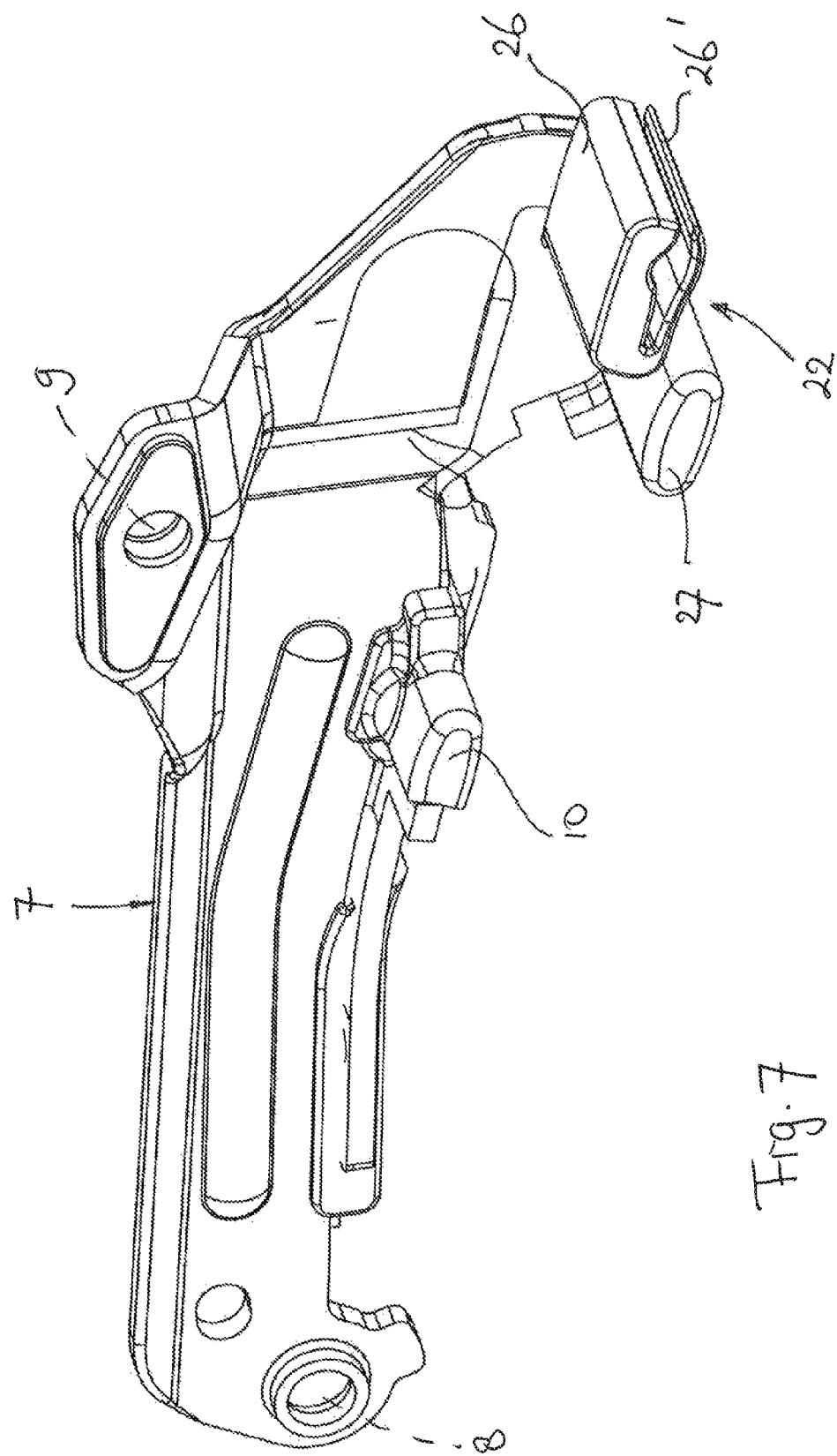
Figure 8:
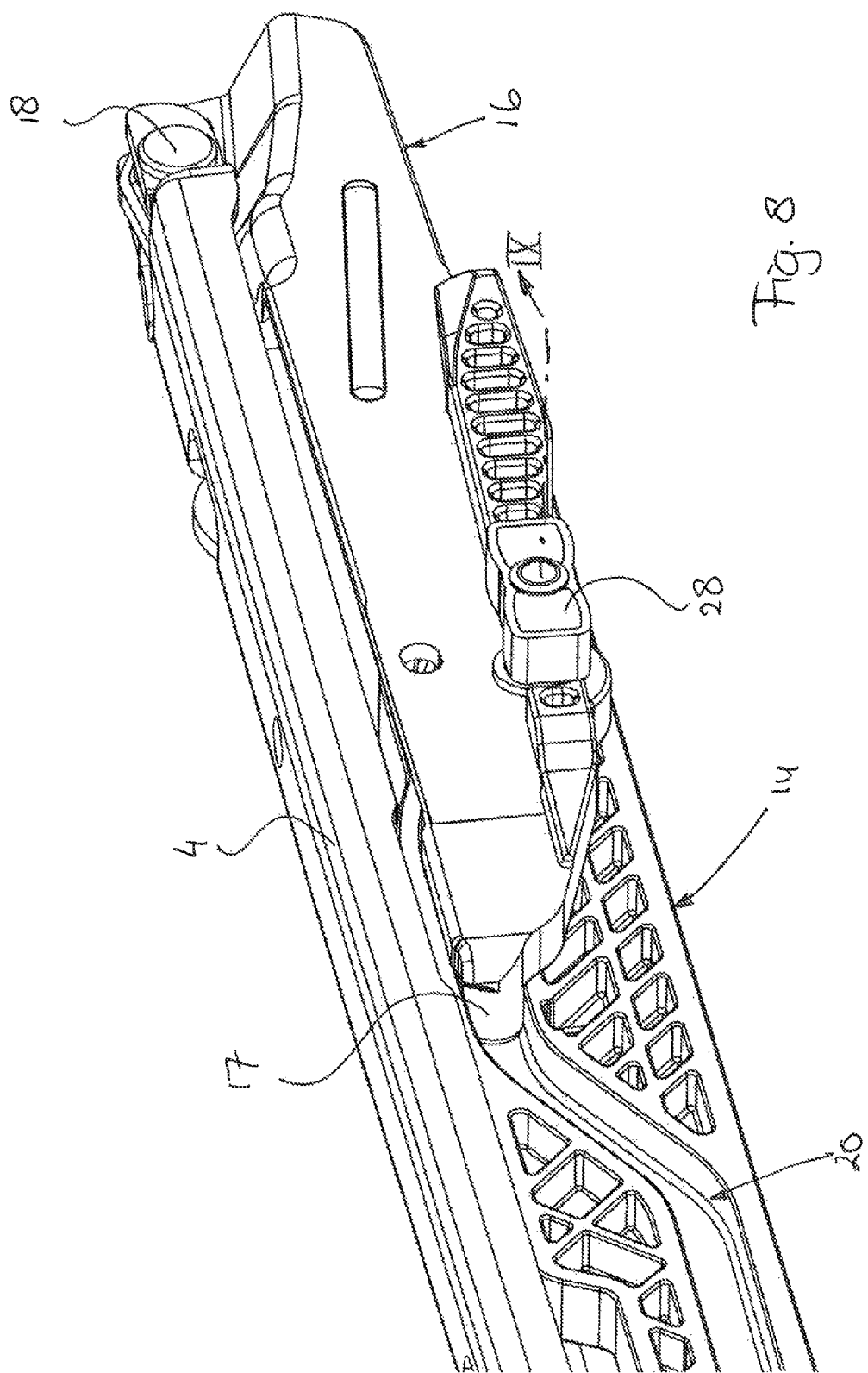
FIG. 8 is a partial perspective view of the rear part of the operating mechanism of FIGS. 3 and 4 with the lever of the rear device, but without guide rail.

The second or front device 5 includes a lever 7. This lever 7 comprises a lower pivot axis, here a pivot pin 8, an upper pivotal connection 9, pivotally connecting the lever 7 to the panel bracket 4 of the panel 3, and a first guide member 10, here in the form of a cam. In the vicinity of the first guide member 10, but on the other side of the lever 7, i.e. on the side facing away from the parts 8, 9 and 10, there is arranged a second guide member 11 in the form of a guide cam. This second guide member 11 is adapted to be in sliding engagement with a first stationary guide curve 12. As shown in FIG. 4, the stationary guide curve 12 includes a rear portion 12' being part of and therefore extending substantially parallel to the guide rail 13 (and panel 3 when in closed position), and a front portion 12" extending substantially at an angle to the rear portion 12' and being wider so that the second guide member 11 will be mainly unsupported during its travel through this front portion 12".

Figure 3:
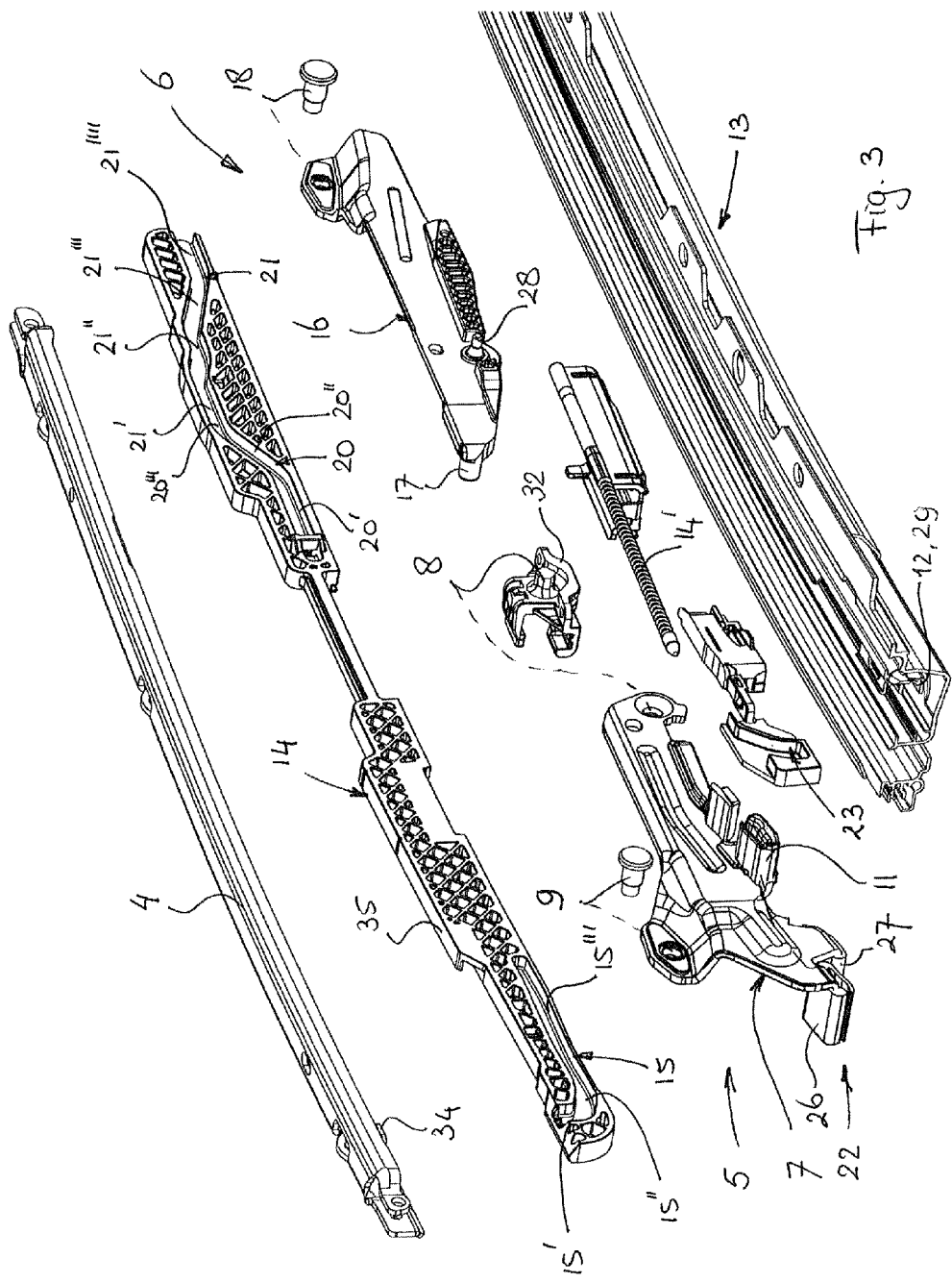
FIGS. 3 and 4 are enlarged exploded views showing the parts of the operating mechanism of the roof system of FIGS. 1 and 2 from two different sides.

In FIGS. 3 and 4 it is shown that the front portion 12" of the stationary guide curve 12 is made in a separate part (e.g. made of plastic, Zamac or cast aluminium) which is attached to a stationary guide rail 13 which is attached to the vehicle roof, either directly or through a frame. The guide rail 13 extends at least along the roof opening 1 in a longitudinal direction of the vehicle. The main part of the rear portion 12' of the stationary guide curve 12 will generally be formed by flanges 13' of the stationary guide rail 13 (see FIG. 4). The stationary guide curve 12 locks the vertical movements of the panel when the panel 3 is in the rearward position (through portion 12').

The first guide member 10 co-operates with a guiding slide 14 (FIGS. 3 and 4) which will generally be connected directly to a driving mechanism, for example an electric motor driving a push and pull cable 14' and therefore also acts as a driving slide. The guiding slide 14 is slidebly guided in the stationary guide rail 13 and determines the movements of the panel 3. The guiding slide 14 includes a front guide curve, here a guide slot, 15 in which the cam of the first guide member 10 slidably engages. The front guide curve 15 includes a substantially vertical front locking portion 15', a lower front curved portion 15" and a rear portion 15'". The extent of the front guide curve 15 determines the vertical movements of the front edge of the panel 3. The rear portion 15'" is substantially straight and almost parallel with respect to the guide rail 14, so that the lever 7 of the first guide member 10 moves forwardly through this rear portion 15'" of the front guide curve 15.

It is shown in FIGS. 3-7 that lever 7 of the second or front device 5 comprises a third guide member 22 positioned at the front end of lever 7 which is in this case forwardly of pivotal connection 9. The distance from the front end of the cam of the first guide member 10 to the rear end of the third guide member 22 should in this case be larger than the distance between the front end of the front guide curve 15 and the front end of the guiding slide 14. This enables the third guide member 22 to be positioned on the side of lever 7 where the guiding slide 14 is present, so that the third guide member 22 does not interfere with guiding slide 14 when it moves upwardly from its lowest position in which it is below guiding slide 14. This upward movement is caused by the extent of a second stationary guide curve 23 with which the third guide member 22 engages. This second stationary guide curve 23 comprises a rear portion 23' which is part of the guide rail 13 and a front portion 23" which is backwardly and upwardly inclined. The inclination of this inclined front portion 23" with respect to a vertical line is relatively large to obtain a movement of the front edge of closure 3 which has a relatively small inclination with respect to the guiderail 13 to conserve a seal 24 of the roof opening 1 and to allow a hook attached to the front of panel 3 to unhook from a counter member on the stationary roof part 2 (not shown). The mean inclination of this front portion 23" will be within a range of 25-60 degrees relative to a vertical line.

The rear portion 23'' of the second stationary guide curve 23 comprises in this embodiment only a single flange 25 extending horizontally in transverse direction. The third guide member 22 comprises two slide shoes 26, 27 at a distance from each other such that in rearward positions of the panel 3, when the third guide member 22 is within the rear portion of the second stationary guide curve 23'', the slide shoes 26, 27 engage opposite sides of the flange 25, so that one slide shoe 26 supports the panel 3 in downward direction and the other 27 supports the panel 3 in upward direction. In the embodiment shown, the front guide member 26 has a lower springy portion 26' to compensate for tolerances.

The first or rear device 6 of the operating mechanism includes a lever 16 (FIGS. 3 and 4). This lever 16 comprises a lower pin or first guide member 17, an upper pivotal connection 18 and a second guide member 19. Both levers 7 and 16 extend at a distance from each other in opposite directions, that is the front lever 7 extends from its connection to the panel 3 backwardly and downwardly, whereas the rear lever 16 extends forwardly and downwardly from the panel 3. As a result, both levers can be controlled by the same guiding slide 14, whereas the levers 7 and 16 connect to the panel 3 at a position near the front or rear edge respectively. This close connection to the front and rear edge of the panel 3 makes the support of the panel 3 very stable.

The slidable connection between the rear lever 16 of the first device 6 and the guiding slide 14 is accomplished by the engagement of the pin 17 and of a cam of the second guide member 19 with a rear guide curve. The rear guide curve in the embodiment as shown in FIGS. 10-14, includes two separate guide curves or slots 20, 21, one for the pin 17 and one for the second guide member 19 as the paths of movement thereof do not overlap. In this case the guide curves 20, 21 connect to each other and form one continuous slot. The guide curve 20 includes a lower front portion 20', a rearwardly and upwardly inclining portion 20'' and a high rear portion 20'''''. The guide curve 21 includes a substantially horizontal front portion 21', a second slightly lower substantially horizontal portion 21'', a rearwardly and downwardly inclining portion 21''', and a substantially horizontal rear portion 21''''.

Figure 9:
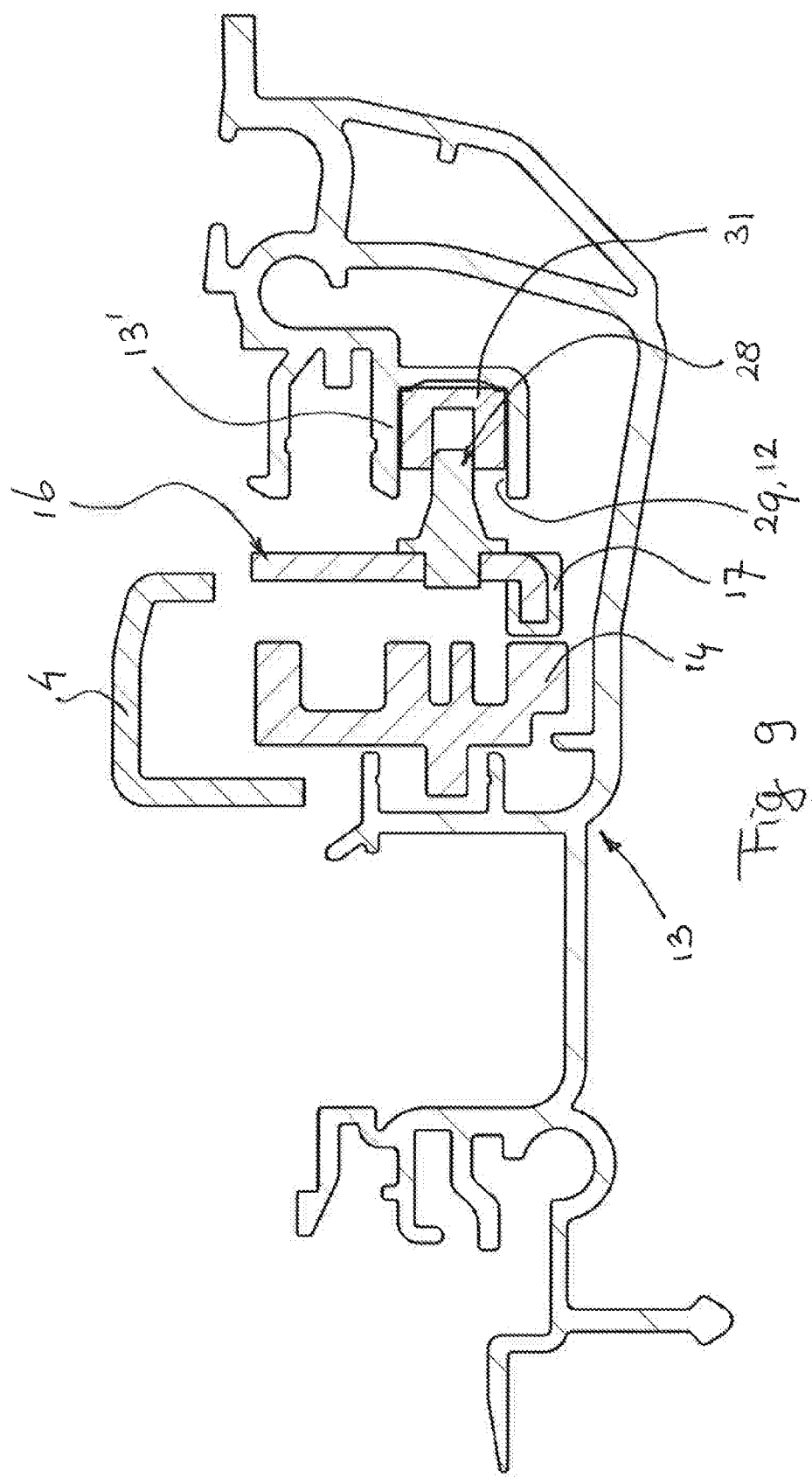
FIG. 9 is a cross-sectional view of the guide rail according to a line IX through a rear part of the operating mechanism of FIGS. 3 and 4 as shown in FIG. 8.

Referring to FIGS. 3 and 9, the lever 16 of the first or rear device 6 comprises on its side facing away from the guiding slide 14 a slide member 28 engaging a rear stationary guide curve 29 in all positions of the closure. This stationary guide curve in this case is an extension of the first stationary guide curve 12 of the front device 5, i.e. a groove of the guide rail 13. The slide member 28 includes a guide shoe 31 which is rotatable with respect to the rear lever 16 to adapt to rotations of this lever 16. As the slide member 28 always remains at the same height with respect to the guide rail 13 it more or less functions as the pivot point for the lever 16.

As is shown in FIG. 4, the panel bracket 4 comprises a lateral projection, here a horizontal lip 34, whereas the guiding slide 14 includes a shoulder 35 below which the lip 34 may engage when the panel 3 is in its closed position in order to provide additional security against unwanted upward movements of the panel 3.

The operation of the operating mechanism of the roof system will be explained mainly with reference to FIGS. 10-15.

In FIG. 10, the operating mechanism is shown with the panel 3 in its closed position. The panel 3 will be pushed forcedly by the operating mechanism with its sealing part 30 in engagement with the seal 24 of the roof opening 1, so that no leakage of noise or water from the environment to the interior of the vehicle will occur. The sealing part 30 and the seal 24 are here fixed to the panel 3 and to the stationary roof part 2, respectively, but they may also be arranged the other way around. In this closed position both levers 7 and 16 of the rear and front devices 6, 5 are in their lowest position. This is accomplished by their engagement with the guiding slide 14 which is in its front position in the guide rail 13. In this front position of the guiding slide 14, the first guide member 10 of the front lever 7 is positioned near the rear end of the rear portion 15''' of the curve 15. The third guide member 22 of the lever 7 is positioned at the lower end of the front portion 23'' of the stationary guide curve . This front portion 23'' of the stationary guide curve 23 provides a stable lock against sliding movements of the panel 3 along the stationary guide rail 13. The horizontal lip 34 is hooked below the shoulder 35 on the guiding slide 14. The upper wall of the front guide curve 15 keeps the cam of the first guide member 10 down. Due to the arrangement of this first guide member 10 near the pivotal connection 9, due to the position of the pivotal connection 9 near the front edge of the panel 3, and due to the additional connection between the panel bracket 4 and the guiding slide 14 there is provided a very stable closed position of the panel in vertical direction at least near the front edge of the panel 3. The second guide member 11 of lever 7 is unsupported within the front portion 12'' of stationary guide curve 12.

In the position of FIG. 11 the guiding slide 14 has been moved over a distance rearwardly such that the first guide member has moved toward the front end of the rear portion 15''' of curve 15. The guiding slide 14 has also moved relative to the rear lever 16 that the second guide member 19 has arrived halfway up the inclined portion 21''' and the first guide member 17 in inclined portion 20''. In this position, the front edge of panel 3 is moved maximally downwardly due to the tilting movement of panel 3 around pivotal connection 9 in which the panel portion behind the pivotal connection 9 is moved upwardly and slightly forwardly, while the panel portion in front of the pivotal connection 9 is moved downwardly and slightly rearwardly, depending on the distance from the pivotal connection 9. The pivotal connection 9 has moved only a small distance upwardly, and as a combined result, the front edge of the panel 3 has moved downwardly and the sealing part 30 on the panel 3 has just released from the seal 24 at the front of the roof opening 1.

In the position of FIG. 12 the guiding slide 14 has been moved over a distance further rearwardly, while the panel 3 is kept substantially in its front position due to the engagement of the slide shoe 26 of the third guide member 22 with the front locking portion 23'' of the stationary guide curve 23 preventing a substantial sliding movement of the panel 3. However, the third guide member 22 has been moved slightly upwardly and rearwardly in this inclined front portion 23'' due to the movement of the first guide member 10 through the portion 15'' of the guide curve 15. As the front locking portion 23'' starts upwardly and rearwardly, the third guide member 22 moves slightly to the rear when it starts to travel through this front portion 23'' and as a result, the panel bracket 4 and panel 3 are slightly moved to the rear while the front edge of the panel 3 moves upwardly. Combined with the movement of the panel front during the tilting motion of the panel 3 (which movement is downwardly and rearwardly), this means that the front sealing part 30 of the panel 3 remains substantially free from the seal 24 at the front of the roof opening 1.

As mentioned, the first guide member 10 is moved into the inclined portion 15'' of the curve 15. During these movements of the lever 7, the lower pivot pin 8 remains at a constant height (due to its pivotal attachment to a slider 32 guided in guide rail 13), but is free to move longitudinally if necessary to allow movements of the lever 7.

The rear lever 16 has been rotated further upwardly due to the engagement of the second guide member 19 in portion 21' of rear guide curve 21 and engagement of first guide member 17 in front lower portion 20' of front guide curve 20 in guiding slide 14.

FIGS. 13 and 14 show further positions of the bracket 4 and operating mechanism, corresponding to the front edge of the panel 3 having been lifted upwardly and a portion of the panel 3 having been slid rearwardly over the adjacent roof part 2'. The sliding movement of the panel 3 has been made possible by the movement of the third guide member 22 in the rearwardly extending portion of the stationary guide curve 23. This has been accomplished by the upward tilting movement of the lever 7 due to the entry of the first guide member 10 into the vertical front locking portion 15' of the front guide curve 15 in the guiding slide 14. The levers 7 and 16 and therefore the panel 3 are now locked in sliding direction with respect to the guiding slide 14. The first guide member 10 is kept in its position in the front locking portion 15' due to the engagement of the second guide member 11 with the rear portion 12' of the first stationary guide curve 12 and the engagement of the third guide member 22 in the rear portion 23' of the second stationary guide curve 23, preventing a vertical movement of the lever 7. Thus, in the position of FIG. 13, the panel 3 and the operating mechanism move as a unit. The roof panel 2' rearwardly of the roof opening 1 is bordered at its longitudinal sides by a slot 36, so that the guiding slide 14 may be slid far rearwardly below the roof panel 2', whereas the panel 3 may move over this roof panel 2', because the rear lever 16 or even also the front lever 7 may project through this slot 36 above the guide rail 13. Normally, the slot is closed by a sealing arrangement, but the sealing arrangement is deformable so that the lever(s) may move through the slot 36 by pushing the seals of the sealing arrangement locally to the side. In this manner the operating mechanism connect the parts below the stationary roof part 2' to parts above the stationary roof part 2'. This enables the operating mechanism to be moved far backwardly so as to create a large roof opening passage.

FIG. 15 illustrates with dashed line C the movement of one point of sealing part 30 at the front edge of panel 3. The black squares F10-F14 correspond to the positions of the operating mechanism of FIGS. 10-14, respectively. It shows that during the movement of panel 3 from the closed to the venting position, sealing part 30 is moved downwardly to such an extent that the following upward and rearward movement does not bring it in contact with seal 24 anymore.

The features of the operating mechanism herein described can provide increased stability, and a desired path of movement of the front edge of the closure, while maintaining a low package height.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. A roof system for a vehicle having a roof opening in a roof part thereof, comprising:
   at least a closure which is movable between a closed position in which it closes the roof opening and an open position in which it opens the roof opening and is positioned at least partially above a rearwardly adjoining roof part;
   a stationary guide rail at each longitudinal side of said roof opening, configured to slidably guide an operating mechanism that operates the closure in a longitudinal direction of the vehicle, said operating mechanism comprising:
   a first device configured to move a rear edge of the closure towards a raised position relative to the closed position and rearwardly above the adjoining roof part;
   a second device including a lever configured to move a front edge of the closure in a horizontal and vertical direction; and
   a guiding slide which is slidably accommodated in the guide rail and operably coupled to the first device and the second device so as to move the closure both in vertical and in horizontal directions through the first and second devices;
   wherein the lever of the second device has a pivotal connection to the closure and, remote from the pivotal connection, a sliding connection to the guiding slide by a first guide member and at least a further sliding connection to a first stationary guide curve by a second guide member during at least a part of the movement of the closure, and wherein there is provided at least a third guide member on the lever of the second device arranged at a position forwardly of the pivotal connection to the closure and engaging a second stationary guide curve at least during a part of the movement of the closure.

2. The roof system of claim 1, wherein the guiding slide includes a curve through which the first guide member moves when the closure moves between the closed position and a venting position in which the rear edge of the closure is lifted, an extent of the curve is such that if the rear edge of the closure is lifted from the closed position a movement of the pivotal connection in vertical direction and a tilting movement of the closure together result in a downward movement of the front edge of the closure.

3. The roof system of claim 2, wherein the extent of the curve in the guiding slide is such that if the rear edge of the closure is lifted from the closed position, the pivotal connection moves in upward direction, but the front edge of the closure moves in downward direction.

4. The roof system of claim 3, wherein the first and second devices are arranged such that the closure moves from the closed position first to a venting position in which the rear edge of the closure is lifted and the closure then moves rearwardly while the front edge of the closure is raised.

5. The roof system of claim 3, wherein the curve comprises a first curve portion which is relatively straight and slightly inclined to cause said movement of the pivotal connection and a second curve portion having a large vertical component to allow the front edge of the closure to be raised and to lock the lever with respect to the guiding slide to move the closure rearwardly toward its open position.

6. The roof system of claim 1, wherein at least the second stationary guide curve comprises a front portion at least partly inclined backwardly and upwardly to raise the front edge of the closure while it is moved rearwardly.

7. The roof system of claim 6, wherein a mean angle of the front portion of the second stationary guide curve is between 25 and 60 degrees with respect to a vertical line.

8. The roof system of claim 1, wherein the second and third guide members are arranged on opposite sides of the lever.

9. The roof system of claim 4, wherein the second guide member is supported in the first stationary guide curve when the closure is moved rearwardly towards its open position after the front edge of the closure has been raised at least partly, while the third guide member is supported by the second stationary guide curve at least when the front edge of the closure is raised.

10. The roof system of claim 1, wherein the third guide member is supported by the second stationary guide curve in all positions of the closure.

11. The roof system according to claim 10, wherein the third guide member includes two slide shoes positioned at a distance from each other, and the second stationary guide curve comprises a flange along at least a part of its length such that the two slide shoes are guided by the flange with the flange extending between the slide shoes.

12. The roof system according to claim 10, wherein the third guide member includes one sliding shoe, and the second stationary guide curve comprises a groove formed by two flanges along at least a part of its length such that the slide shoe is guided by the flanges of the groove.

13. The roof system of claim 1, wherein the lever of the second device is pivotally connected to a slider slidably guided by the guide rail.

14. The roof system of claim 1, wherein the first device also comprises a lever being pivotally connected to the closure near the rear edge thereof, having at least a first guide member slidably engaging the guiding slide on one of its sides and at least a slide member on its opposite side engaging a stationary guide curve.

15. A roof system for a vehicle having a roof opening in a roof part thereof, comprising:

a closure;

a pair of guide rails;

a pair of operating mechanisms, each operating mechanism moveable through one of the guide rails, each operating mechanism coupled to the closure to move the closure between a closed position herein defined as when the closure closes the roof opening and an open position herein defined as when the closure opens the roof opening at least partially, each of said operating mechanisms comprising:

a first device configured to move a rear edge of the closure towards a raised position relative to the closed position;

a second device including a lever configured to move a front edge of the closure in a vertical direction; and a guiding slide which is slidably accommodated in a corresponding guide rail and operably coupled to the first device and the second device so as to move the closure both in vertical and in horizontal directions through the first and second devices;

wherein said lever of the second device has a pivotal connection to the closure and, remote from the closure, a sliding connection to the guiding slide through a first guide member and at least a further sliding connection to a first stationary guide curve of the guide rail through a second guide member during at least a part of the movement of the closure; and wherein the lever of the second device comprises at least a third guide member arranged on a same side of the lever as the first guide member and at a distance forwardly thereof, and engaging at least during a part of the movement of the closure a second stationary guide curve of the guide rail.

* * * * *